US007203503B2

(12) United States Patent
Cedervall et al.

(10) Patent No.: US 7,203,503 B2
(45) Date of Patent: Apr. 10, 2007

(54) METHOD AND SYSTEM FOR LOCATING MOBILE STATIONS IN A MOBILE COMMUNICATION NETWORK

(75) Inventors: Mats Cedervall, Täby (SE); Ari Kangas, Stockholm (SE); Johan Jobėr, Shinjuku-ku (JP)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 79 days.

(21) Appl. No.: 09/815,337

(22) Filed: Mar. 23, 2001

(65) Prior Publication Data

US 2001/0046869 A1    Nov. 29, 2001

(30) Foreign Application Priority Data

Mar. 23, 2000    (EP)    ................................. 00850053

(51) Int. Cl.
*H04Q 7/20* (2006.01)
*H04M 11/04* (2006.01)

(52) U.S. Cl. ............................... 455/456.5; 455/456.1; 455/456.6; 455/422.1; 455/404.2

(58) Field of Classification Search ................. 455/440, 455/456.1–456.6, 507, 506, 509, 404.2, 433–434, 455/422.1, 457–458, 461–465, 517, 524, 455/550.1, 553.1, 560–561, 556.2, 67.11; 340/539.13, 989, 426.19, 426.2, 426.21, 340/539.1, 539.11, 539.12; 342/126–130, 342/450; 701/213–217, 300
See application file for complete search history.

(56) References Cited

U.S. PATENT DOCUMENTS

| 5,327,144 | A | | 7/1994 | Stilp et al. |
| 5,515,378 | A | | 5/1996 | Roy, III et al. |
| 5,835,857 | A | * | 11/1998 | Otten .......................... 455/410 |
| 5,890,068 | A | * | 3/1999 | Fattouche et al. ....... 455/456.2 |
| 5,973,643 | A | * | 10/1999 | Hawkes et al. ............. 342/457 |

OTHER PUBLICATIONS

Communication pursuant to Article 96(2) EPC issued on Mar. 24, 2006 by the European Patent Office in Application No. 01 850 054.6. (References listed in this communication were previously cited in an Information Disclosure Statement filed on Jun. 11, 2001.)

* cited by examiner

*Primary Examiner*—Meless N. Zewdu
(74) *Attorney, Agent, or Firm*—Nixon & Vanderhye P.C.

(57) ABSTRACT

A method and system for locating mobile stations within a mobile communication network including at least two mobile stations and at least three base stations. Signal measurements are performed at the mobile stations and/or the base stations. Two or more mobile stations are located simultaneously by minimizing a cost-function, which is achieved by means of a sufficient number of equations, wherein the equations comprises the location of the mobile stations as a function of the location of one of the base stations in the network and the performed signal measurements.

22 Claims, 4 Drawing Sheets

METHOD AND SYSTEM FOR LOCATING MOBILE STATIONS IN A MOBILE COMMUNICATION NETWORK

The invention is concerned with the location of mobile stations within a mobile communication network including mobile stations and base stations.

TECHNICAL BACKGROUND

Location based services for mobile stations are expected to play an important role in future applications of wireless systems. Some examples of such services are emergency services, road assistance, location based "yellow pages" and traffic information.

A wide variety of technologies for locating mobile stations have been developed. Many of these have been targeted towards the United States Federal Communication Commission (US FCC) requirement to determine the location of emergency 911 callers with high accuracy. These technologies may be classified into external methods or network based methods. An example of an external method is the Global Positioning System (GPS). The network based methods can be further categorized depending on whether it is the network or the mobile station that performs necessary signal measurements. The signal measurements themselves may involve the reception time of signals communicated between a base station BS and a mobile station MS, the angle of arriving signals or round trip delay measurements of signals communicated between a serving BS and an MS, or combinations thereof.

Most methods require specific hardware in the MS and/or in the network. Furthermore, Location Measurement Units (LMUs) are required for some methods to obtain knowledge about the relative time differences for sending signals to different mobile stations. This means that the operator is faced with an initial cost for investing in new equipment. This applies for both network and MS based methods.

For many location based services, it is expected that an accuracy of 500 m or even more is sufficient. For these types of services, investments in new expensive equipment is not easily justified. For some cases, a phased solution is the most attractive choice. The operator will then initially offer services based on low accuracy positioning methods and may later invest in new equipment as the revenues increase.

For these reasons, it is of interest to investigate what can be done with a minimum of network impact. The currently available network information with respect to MS location includes the identity of the serving cell, timing advance and measurement reports from the MS. The timing advance is an estimate of a signal propagation time and is used for calculating the distance between the serving BS and the MS. The MS measurement reports include measurements of the received signal strengths and identities of neighboring BS's as well as those of the serving BS.

Time of Arrival (TOA) measurements provide a propagation time of signals between an MS and a BS. Time Difference of Arrival (TDOA) measurements provide the difference of signal propagation time of signals between the MS and two different BS's. The measurements of the two BS's are then used for calculating the actual position of the MS. This procedure, using well-known geometric equations, is called triangulation.

In a TOA measuring procedure as illustrated in FIG. 1, a mobile station MS is capable of communication with at least three base stations BS1–BS3. In order to determine the position of the MS, the distance between the MS and each of the three BS's is measured using the TOA technique. The measured distance R1 of BS1 defines a circle C1 around BS1, and the MS is located somewhere on the circle C1. Likewise, distances R2 and R3 of BS2 and BS3 respectively, are measured for defining the corresponding circles C2 and C3. The intersection of the circles C1, C2 and C3 define the location of the MS. This technique is further described in the International Patent Application WO 99/21389, which is incorporated herein by reference.

In the Time Difference of Arrival (TDOA) measuring technique, the position determinations use TDOA calculations which are further based on Time of Arrival (TOA) measurements. In this method, the position of the mobile station is located at or near the point where a plurality of hyperbolic arcs cross over one another. Such a method is described in the International Patent Application WO 99/29130, which is incorporated herein by reference.

The two most common known positioning methods are the Down-link Observed Time Difference of Arrival method (DL-OTDOA) and the Up-link Time of Arrival method (UL-TOA). The DL-OTDOA method is based on measurements performed by the MS.

FIG. 2 illustrates how the DL-OTDOA method works. A mobile station is capable of communication with a serving base station SBS at a distance d0 and further with two neighboring base stations NBS1 and NBS2 at distances d1 and d2 respectively. OTDOAs of downlink signals received from two base stations define a hyperbola, which is illustrated with dotted lines in FIG. 2. The areas indicated outside the dotted lines represent measurement error margins. When three or more BSs are available, a plurality of hyperbolas can be defined and the MS will be located in the intersection of these hyperbolas, which is indicated as a black area including the respective measurement error margins. In order to compensate for any non-time aligned transmissions from the different BSs, the Real Time Differences (RTDS) must be known if the BSs are not time synchronized, e.g., to a global time reference. The RTDs can be obtained e.g. by having LMUs in at least some of the BSs.

UL-TOA works in a similar manner, although in this case, the BSs make measurements on uplink signals transmitted by the MS.

The accuracy of the method depends on, e.g., the accuracy of the measurements but also on the relative positions of the MS and the BSs involved. The accuracy can be very poor for some configurations, which is sometimes referred to as Geometrical Dilution of Precision (GDOP). Mathematically, GDOP is defined as the accuracy of the position fix divided by the accuracy of the measurements.

The object of the invention is to provide a simple method of locating mobile stations in connection with unsynchronized base stations without requiring Location Measurement Units (LMUs).

SUMMARY OF THE INVENTION

The location of mobile stations in a communication network according to the invention includes locating at least two mobile stations simultaneously by minimizing a cost-function, which is achieved by using a sufficient number of equations. In each of these equations, the location of a mobile station is a function of the location of a base station in the network, and performed signal measurements including reception times. Thereby, the need for LMUs is eliminated for locating mobile stations using unsynchronized base stations The signal measurements may be performed by the mobile stations and comprise receiving times of signals received from base stations in the network and optionally Round Trip Time (RTT) measurements. The Round Trip Time is the signal propagation time from a base station to a mobile station and back. Depending on the situation, it is decided whether to perform measurements of RTT for a serving or neighboring base station. This decision may depend on, e.g., the equipment being available or the complexity of the network system.

The location of a mobile station is described by geographical co-ordinates of pre-determined dimensions, typically two or three co-ordinates. The number of equations, the number of simultaneously located mobile stations and the number of involved base stations needed for determining the location of mobile stations, all depend on the pre-determined dimensions of the co-ordinates and the knowledge of RTTs.

By positioning at least two MSs simultaneously, it is possible to avoid the requirement of using LMUs when the BSs are unsynchronized. In this context, simultaneously means that signal measurements are made close enough in time such that the BS clocks have not drifted significantly. In practice, this could mean for instance that the measurements must be made within approximately one minute.

In the following, some preferred embodiments of the invention are described with reference to the figures below. However, the invention is not in any way limited to the various details of the described embodiments, which are presented for illustrative purposes only.

FIGURES

DETAILED DESCRIPTION

Figure 1:
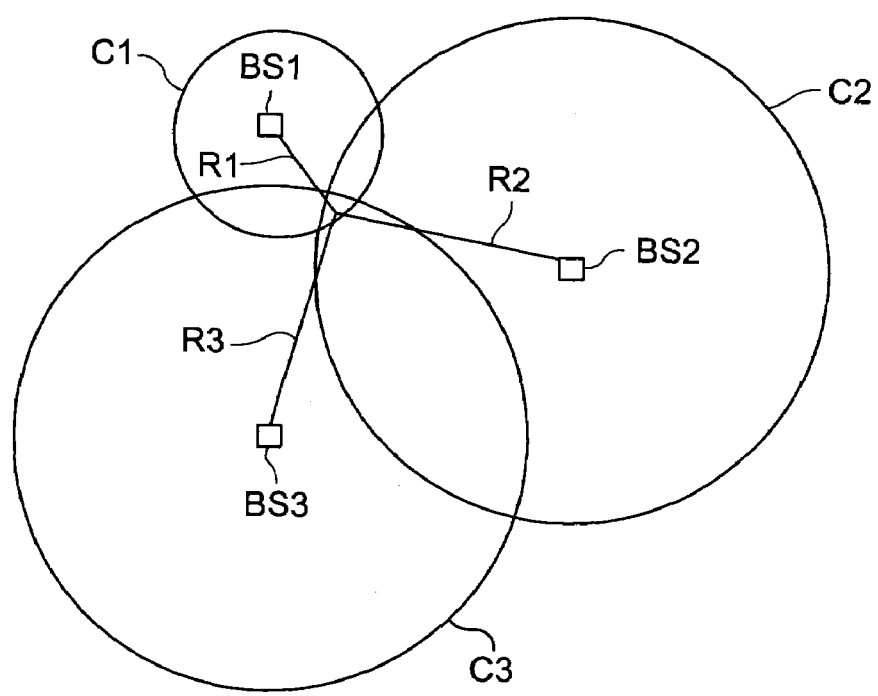
FIG. 1 is a schematic view illustrating a prior art positioning method.
Figure 2:
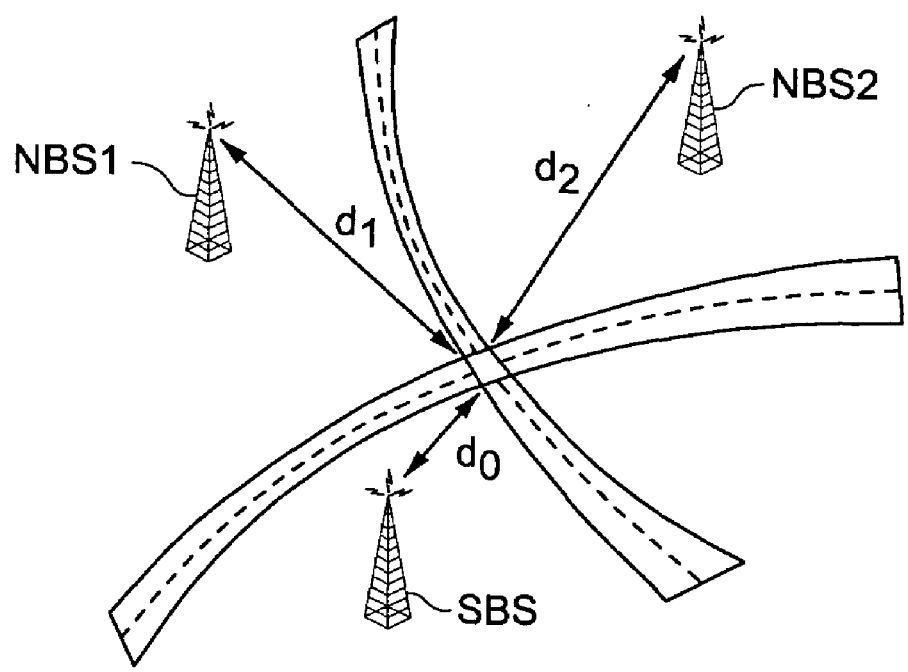
FIG. 2 is a schematic view illustrating another prior art positioning method.

When determining the location of at least two mobile stations MSs by performing signal measurements involving at least three base stations BSs, the minimization of a cost-function provides the locations of the at least two MSs. The cost-function can be obtained by means of a sufficient number of equations, each of which includes an MS location as a function of the location of a BS and performed signal measurements.

In the general case, the distance between a BSi and an MSj is given by the following equation:

$$T_{ij} = T_i + d_{ij}/c + \tau_j + e_{ij} \tag{1}$$

where $T_i = T_1, \ldots T_{nb}$ denotes the transmission time from BSi = BS1 ... BSnb, $T_{ij}$ denotes the reception time at MSj of a signal from BSi, $\tau_j = \tau_1, \tau_2 \ldots \tau_{nm}$ denotes a time-offset which is the difference in time-base used as reference by MS1, MS2 ... MSnm, compared to a common time reference, c is the propagation speed of the radio waves, $e_{ij}$ represents measurement errors, j=1, ..., nm, where nm denotes the number of MSs, i=1, ..., nb, where nb denotes the number of BSs, and $d_{ij}$ is the distance between BSi and MSj.

$d_{ij}$ can be expressed as:

$$d_{ij} = \|B_i - M_j\|$$

where $M_j$ denotes the coordinates of MSj, and $B_i$ denotes the co-ordinates of BSi.

Since the MS measurements are performed with reference to the time-base of each respective mobile station, the relations between the MS time-bases, given by $\tau$, are additional unknown terms since the MSs are not synchronized, i.e., do not have a common time reference. A common clock reference may be defined to be equal to the clock of, e.g., MS1, hence $\tau_1 = 0$, which reduces the number of unknown terms by one. Furthermore, each BS may be able to measure the round trip time RTT of signals from the BS to an MS and back. This measurement is related to the distance between MSj and BSi as:

$$RTT_{ij} = 2*d_{ij}/c + v_{ij} \tag{2}$$

where $v_{ij}$ denotes a measurement error. Note that the equation (2) allows for RTT to be defined for more than one BS per MS.

The location of an MS can be defined by either two or three geographical co-ordinates depending on whether it is necessary to determine the height position. The third height co-ordinate may be needed in, e.g., mountainous environments or multi-floor buildings.

It is a well-known fact that in order to calculate unknown values, the number of equations must be at least equal to the number of unknowns. If the RTT of one BS is known for all MSs, the number of equations is nm*nb+nm. If no RTT is known, the number of equations is nm*nb. In both cases, the number of unknowns is (C+1)*nm+nb−1, where C is the number of used co-ordinates, i.e., 2 or 3. C*nm is the number of unknown co-ordinates for nm MSs, nb is the number of unknown transmit times $T_i$, and nm−1 is the number of unknown time offsets $\tau_j$.

The following tables show the number of equations minus the number of unknowns for different numbers of MSs and BSs and combinations thereof. The tables include cases using two- or three-dimensional co-ordinates as well as cases with or without knowledge about the RTT of one BS.

TABLE 1

The number of equations minus the number of unknowns when two-dimensional co-ordinates are used and the RTTs to one BS from all MSs are known.

| n.MS/nBS | 1 | 2 | 3 | 4 | 5 | 6 |
|---|---|---|---|---|---|---|
| 1 | −1 | −1 | −1 | −1 | −1 | −1 |
| 2 | −2 | −1 | 0 | 1 | 2 | 3 |
| 3 | −3 | −1 | 1 | 3 | 5 | 7 |

TABLE 2

The number of equations minus the number of unknowns when two-dimensional co-ordinates are used and the RTTs are unknown.

| n.MS/nBS | 1 | 2 | 3 | 4 | 5 | 6 |
|---|---|---|---|---|---|---|
| 1 | −2 | −2 | −2 | −2 | −2 | −2 |
| 2 | −4 | −3 | −2 | −1 | 0 | 1 |
| 3 | −6 | −4 | −2 | 0 | 2 | 4 |
| 4 | −8 | −5 | −2 | 1 | 4 | 7 |

TABLE 3

The number of equations minus the number of unknowns when three-dimensional co-ordinates are used and the RTTs are known.

| n.MS/nBS | 1 | 2 | 3 | 4 | 5 | 6 |
|---|---|---|---|---|---|---|
| 1 | −2 | −2 | −2 | −2 | −2 | −2 |
| 2 | −4 | −3 | −2 | −1 | 0 | 1 |
| 3 | −6 | −4 | −2 | 0 | 2 | 4 |

TABLE 4

The number of equations minus the number of unknowns when three-dimensional co-ordinates are used and the RTTs are unknown.

| n.MS/nBS | 1 | 2 | 3 | 4 | 5 | 6 | 7 |
|---|---|---|---|---|---|---|---|
| 1 | −3 | −3 | −3 | −3 | −3 | −3 | −3 |
| 2 | −6 | −5 | −4 | −3 | −2 | −1 | 0 |
| 3 | −9 | −7 | −5 | −3 | −1 | 1 | 3 |

From these tables, it is understood that the calculations are significantly simpler when two-dimensional co-ordinates are used.

The requirement of a necessary number of equations versus number of unknowns is not the only condition for performing successful location determinations. There are degenerate cases of geographical MS distribution when the geometry makes it impossible to determine the MS positions. A trivial example of a degenerate case is when the MSs are very close to each other, which will lead to poor GDOP.

Figure 3:
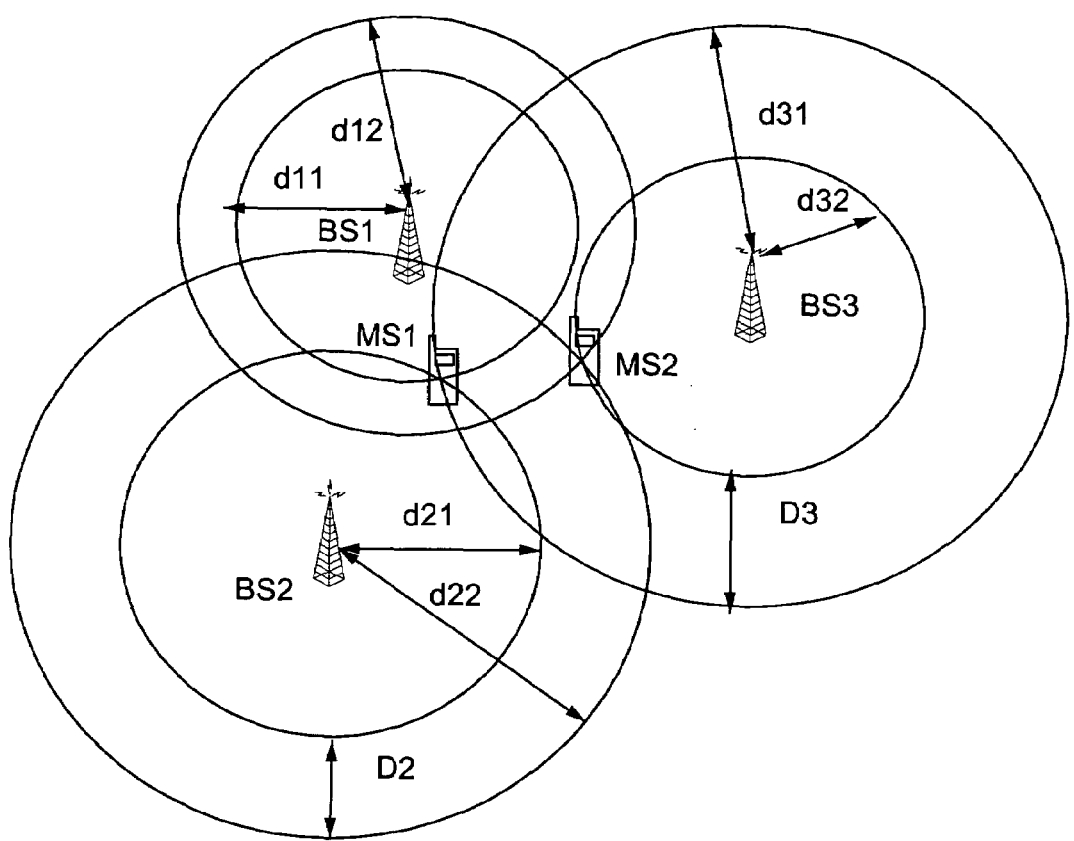
FIG. 3 is a schematic view of a preferred embodiment of the invention.

FIG. 3 illustrates a preferred embodiment of the invention being implemented in a simple scenario involving two mobile stations MS1, MS2 and three base stations BS1–BS3. In this example, BS1 is the current serving base station for both MS1 and MS2.

Both MS1 and MS2 measure and report reception times, or Times of Arrival, TOAs, of signals sent from BS1, BS2 and BS3 respectively. Generally, $T_{ij}$ is the reception time at MSj of a signal from BSi, see (1). RTTs are measured at BS1 for both MS1 and MS2. For illustration purposes only, we assume that the measurements are noise free, wherein the resulting equations are (see also (1),(2)):

$$T_{11} = T_1 + d_{11}/c \quad (3)$$

$$T_{21} = T_2 + d_{21}/c \quad (4)$$

$$T_{31} = T_3 + d_{31}/c \quad (5)$$

$$T_{12} = T_1 + d_{12}/c + \tau_2 \quad (6)$$

$$T_{22} = T_2 + d_{22}/c + \tau_2 \quad (7)$$

$$T_{32} = T_3 + d_{32}/c + \tau_2 \quad (8)$$

$$RTT_{11} = 2 \ast d_{11}/c \quad (9)$$

$$RTT_{12} = 2 \ast d_{12}/c \quad (10)$$

From equation (10), it can be concluded that MS2 is located somewhere on a circle defined by the location of BS1 and $d_{12}$. Correspondingly from (9), MS1 is located somewhere on a circle defined by the location of BS1 and $d_{11}$.

$T_1$ can be determined by inserting $d_{11}$ from (10) into (3). Then, $\tau_2$ can be determined by inserting $T_1$ and $d_{12}$ from (9) into (6)

Now, D2 is defined as the difference in distance of MS1 and MS2 to BS2:

$$d_{22} = d_{21} + D2 \quad (11)$$

D2 is related to the difference in propagation delay for signals from BS2 to MS2 and MS1. i.e., D2 can be calculated by subtracting (7) from (4) with the following result:

$$D2 = c \ast (T_{22} - T_{21} - \tau_2)$$

Correspondingly, D3 is defined as the difference in distance of MS1 and MS2 to BS3, being related to the difference in propagation delay for signals from BS3 to MS1 and MS2, i.e., $$d_{31} = d_{32} + D3 \quad (12)$$

Note that we have changed the order of MS1 and MS2 in order to ensure that D2 is a positive distance according to FIG. 3. This is done solely for illustration purposes. D3 can be derived by subtracting (5) from (8):

$$D3 = c \ast (T_{31} - T_{32}\tau_2)$$

Thus, MS1 is located at a position defined by the following three circles;
the circle defined by the location of BS1 and $d_{11}$,
the circle defined by the location of BS2 and $d_{21}$ and
the circle defined by the location of BS3 and $d_{32}+D3$.

MS2 is located at a position defined by the following three circles:
the circle defined by the location of BS1 and $d_{12}$,
the circle defined by the location of BS2 and $d_{21}+D2$, and
the circle defined by the location of BS3 and $d_{32}$.

In the non-degenerate case, $d_{21}$ and $d_{32}$, which are unknown, can be estimated graphically by adjusting them until the three circles corresponding to MS1 intersect at one point at the same time as the three circles corresponding to MS2 intersect at another point. Note that when $d_{21}$ and $d_{32}$ are adjusted, $d_{22}$ and $d_{31}$ are also adjusted such that the distance differences D2 and D3 between the radii are maintained. The co-ordinates of the two intersecting points will then provide the locations of MS1 and MS2.

In practice, measurement errors will occur such that the six circles do not intersect at two exact locations. In the normal case, the MS locations may be determined with a minimization approach, e.g., using the least square method. In short, this means that the MS locations are selected such that the summed squared distance from the MSs to the above described six circles. i.e., three circles per MS, is minimized. This is generally referred to as minimizing a cost-function.

In the following, we illustrate the least squares process in a slightly more generic setting. First, the unknown transmit times and clock offsets are eliminated by subtracting twice: Equations (7)-(6)-((4)-(3)) and ((8)-(6)-(5)-(3)) give:

$$T_{22} - T_{12} - (T_{21} - T_{11}) = (d_{22} - d_{12} - (d_{21} - d_{11}))/c + e1 \quad (13)$$

$$T_{32} - T_{12} - (T_{31} - T_{11}) = (d_{32} - d_{12} - (d_{31} - d_{11}))/c + e2 \quad (14)$$

where e1, e2 represent the sum of individual measurement errors. In (13) and (14), the only unknowns are the MS location co-ordinates $M_1$ $M_2$ contained in the $d_{ij}$'s. By adding the RTT measurements of (9) and (10), we have four equations and four unknowns. In order to simplify notation, the following is defined:

$$y1 = T_{22} - T_{12} - (T_{21} - T_{11})$$

$$y2 = T_{32} - T_{12} - (T_{31} - T_{11})$$

$$f1 = (d_{22} - d_{12} - (d_{21} - d_{11}))/c$$

$$f2 = (d_{32} - d_{12} - (d_{31} - d_{11}))/c$$

Finally, the least squares criterion is defined in matrix formulation:

$$V(M_1, M_2) = [y1 - f1y2 - f2RTT_{11} - d_{11}/cRTT_{12} - d_{12}/c]Q \\ [y1 - f1y2 - f2RTT_{11} - d_{11}/cRTT_{12} - d_{12}/c]' \quad (15)$$

Q is a weighting matrix, which is normally based on estimates of the measurement errors in the equations (9)–(10), (13)–(14).

Estimates of the location co-ordinates $M_1$ and $M_2$ are obtained as the minimizing arguments of the least squares criterion (15):

$$M_1, M_2 = \arg\min V(M1, M2) \quad (16)$$

EXAMPLE

In order to evaluate the likelihood of bad GDOP, the invented method has been evaluated with numerical simulations and compared to a prior art method.

It should be noted that after the MS locations have been calculated, the relative time differences RTDs of the involved BSs are known. This means that, If the location of a further MS is to be determined, it is sufficient to perform measurements by that MS only, provided that the BSs clocks have not drifted significantly in relation to each other In this further example, three BSs are located in a uniform pattern and 1000 MSs are randomly located in the surrounding area. The true TOAs are calculated and an error corresponding to 100 m is added to all TOA values (including those calculated from measurements performed by LMUs and BSs). The MS locations are then estimated with the least square method for both the method according to the invention and the previously known OTDOA method using LMUs.

Figure 4:
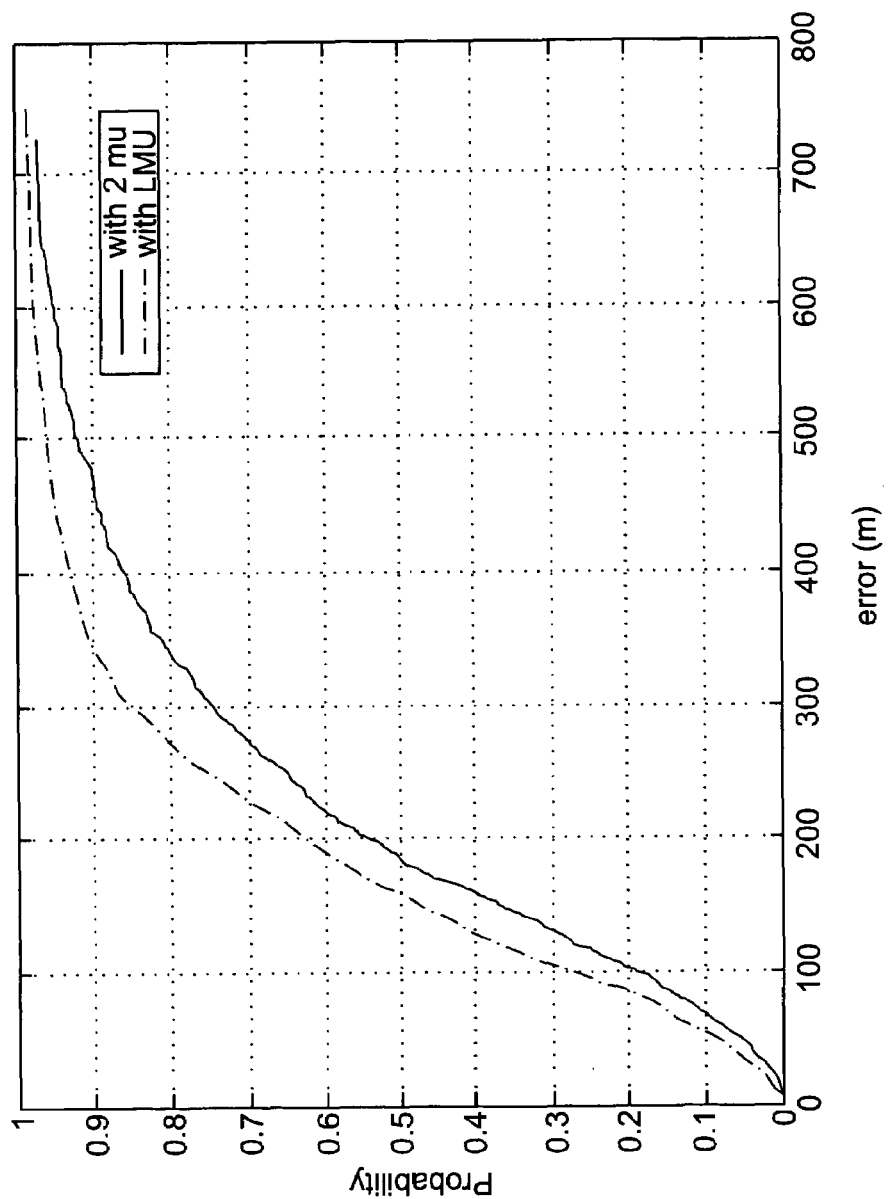
FIG. 4 is a diagram presenting simulation results of the method of the invention compared with results of a prior art method.

The invented method is evaluated in the case when RTT measurements are performed and when two-dimensional co-ordinates are considered. As a reference, the standard OTDOA method is evaluated for the same MSs. The results of this evaluation are shown in FIG. 4, which presents the cumulative distribution functions of the errors for the method of the invention and for the standard OTDOA method using LMUs. As might be expected, the performance of the invented method is slightly poorer than the OTDOA method, but on the other hand, it is much less expensive to implement. One reason for the inferior performance is the properties of the GDOP.

The invention claimed is:

1. A method of locating mobile stations within a mobile communication network including a plurality of mobile stations and a plurality of base stations, the method comprising the steps of:
    performing measurements on signals communicated between at least three base stations and at least two mobile stations; and
    locating the at least two mobile stations simultaneously using a number of equations, wherein the number of equations is (nm*nb+nm) if a round trip time (RTT), to transmit a signal from one base station to a mobile station and receive the transmitted signal back from the mobile station is known for at least two mobile stations, or the number of equations is (nm*nb) if the (RTT) for the one base station is not known for the at least two mobile stations,
    wherein nm is a number of mobile stations to be located and nb is a number of base stations involved in locating the nm mobile stations, and
    wherein each equation comprises the location of a mobile station as a function of the location of a base station and the performed signal measurements.

2. The method of claim 1, wherein the performed signal measurements include
    the reception time of signals communicated between said at least three base stations and said at least two mobile stations.

3. The method of claim 1, wherein the performed signal measurements include the Round Trip Time of signals communicated between said at least three base stations and said at least two mobile stations.

4. The method of claim 3, wherein said number of equations is based on the knowledge of said Round Trip Times.

5. The method of claim 1, wherein the locations of the mobile stations are defined by co-ordinates of pre-determined dimensions.

6. The method of claim 5, wherein the locations of the mobile stations are defined by two co-ordinates.

7. The method of claim 5, wherein the locations of the mobile stations are defined by three co-ordinates.

8. The method of claim 5, wherein said number of equations is based on said pre-determined dimensions of the co-ordinates.

9. The method of claim 1, wherein the number of simultaneously located mobile stations and the number of base stations being involved in said performed signal measurements are based on the knowledge of measured Round Trip Times and pre-determined dimensions of co-ordinates defining the locations of the mobile stations.

10. The method of claim 1, wherein said signal measurements are performed close enough in time such that clocks in the base stations have not drifted significantly in relation to each other.

11. The method of claim 10, wherein said signal measurements are performed within one minute.

12. A system for locating mobile stations within a mobile communication network including a plurality of mobile stations and a plurality of base stations, the system comprising:
    at least two mobile stations;
    at least three base stations;
    means for performing measurements on signals communicated between the at least three base stations and the at least two mobile stations; and
    means for locating the at least two mobile stations simultaneously using a number of equations, wherein the number of equations is (nm*nb+nm) if a round trip time (RTT), to transmit a signal from one base station to a mobile station and receive the transmitted signal back from the mobile station is known for at least two mobile stations, or the number of equations is (nm*nb) if the (RTT) for the one base station is not known for the at least two mobile stations,
    wherein nm is a number of mobile stations to be located and nb is a number of base stations involved in locating the nm mobile stations, and wherein each equation comprises the location of a mobile station as a function of the location of a base station and the performed signal measurements.

13. The system of claim 12, wherein said performed signal measurements include
a reception time of signals communicated between said at least three base stations and said at least two mobile stations.

14. The system of claim 12, wherein said performed signal measurements include the Round Trip Time of signals communicated between said at least three base stations and said at least two mobile stations.

15. The system of claim 14, wherein said sufficient number of equations is based on the knowledge of said Round Trip Times.

16. The system of claim 12, wherein the locations of the mobile stations are defined by co-ordinates of pre-determined dimensions.

17. The system of claim 16, wherein the locations of the mobile stations are defined by two co-ordinates.

18. The system of claim 16, wherein the locations of the mobile stations are defined by three co-ordinates.

19. The system of claim 16, wherein said number of equations is based on said pre-determined dimensions of the co-ordinates.

20. The system of claim 12, wherein the number of simultaneously located mobile stations and the number of base stations being involved in said performed signal measurements are based on the knowledge of measured Round Trip Times and pre-determined dimensions of co-ordinates defining the locations of the mobile stations.

21. The system of claim 12, wherein said signal measurements are performed close enough in time such that clocks in the base stations have not drifted significantly in relation to each other.

22. The system of claim 12, wherein said signal measurements are performed within one minute.

* * * * *